United States Patent [19]

Kelly et al.

[11] Patent Number: 5,657,069

[45] Date of Patent: Aug. 12, 1997

[54] METHOD AND APPARATUS FOR GREY LEVEL PRINTING

[75] Inventors: E. Michael Kelly, Penfield; James R. Prowak, Chili, both of N.Y.

[73] Assignee: Eastman Kodak Company, Rochester, N.Y.

[21] Appl. No.: 807,522

[22] Filed: Dec. 13, 1991

[51] Int. Cl.[6] .................................. B41T 2/45; B41T 2/47; G01D 15/14; H04N 1/23

[52] U.S. Cl. ...................... 347/237; 347/238; 347/240; 358/298

[58] Field of Search .................................. 346/107 R, 1.1, 346/107 A; 358/298; 377/52, 54; 364/270.2; 328/61, 63; 347/237, 238, 240, 130, 131, 132

[56] References Cited

U.S. PATENT DOCUMENTS

| | | | |
|---|---|---|---|
| 3,651,414 | 3/1972 | Jamieson | 377/44 |
| 3,850,517 | 11/1974 | Stephany et al. | |
| 4,513,278 | 4/1985 | Seitz et al. | 340/347 DA |
| 4,535,466 | 8/1985 | Palvolgyi | 377/54 |
| 4,563,693 | 1/1986 | Masaki | 358/298 X |
| 4,746,941 | 5/1988 | Pham et al. | 346/154 X |
| 4,750,010 | 6/1988 | Ayers et al. | 346/107 R |
| 4,855,760 | 8/1989 | Kanayama | 346/108 |
| 4,885,597 | 12/1989 | Tschang et al. | 346/154 X |
| 4,905,022 | 2/1990 | Nagasawa | 346/108 |
| 4,941,001 | 7/1990 | Potucek | 346/154 |
| 5,025,322 | 6/1991 | Ng | 358/298 |

FOREIGN PATENT DOCUMENTS

WO88/07729  10/1988  WIPO.
WO91/10311  7/1991  WIPO.

OTHER PUBLICATIONS

L.L. Johnson and R.T. Joseph, "Random Timing Generator", *IBM Technical Disclosure Bulletin*, vol. 12, No. 4, Sep. 1969, p. 614.

*Primary Examiner*—Mark J. Reinhart
*Assistant Examiner*—David Yockey
*Attorney, Agent, or Firm*—Norman Rushefsky

[57] ABSTRACT

A method and apparatus for grey level printing includes a plurality of recording elements which are enabled for variable periods of time during a cycle of recording grey level pixels. For each recording element a comparator compares the count in a time-changing exposure counter with a multibit grey level data signal. The exposure counter is decremented/incremented by exposure clock pulses from a programmable exposure clock. The exposure clock includes a master clock and an address counter that provides an incremented address signal in response to each set of N pulses from the master clock. The address signal identifies a location in memory of a set of signals used to generate exposure clock pulses. The set of signals is output in parallel to a serial shift register and shifted out serially to form the exposure clock pulses for decrementing/incrementing the exposure counter.

15 Claims, 4 Drawing Sheets

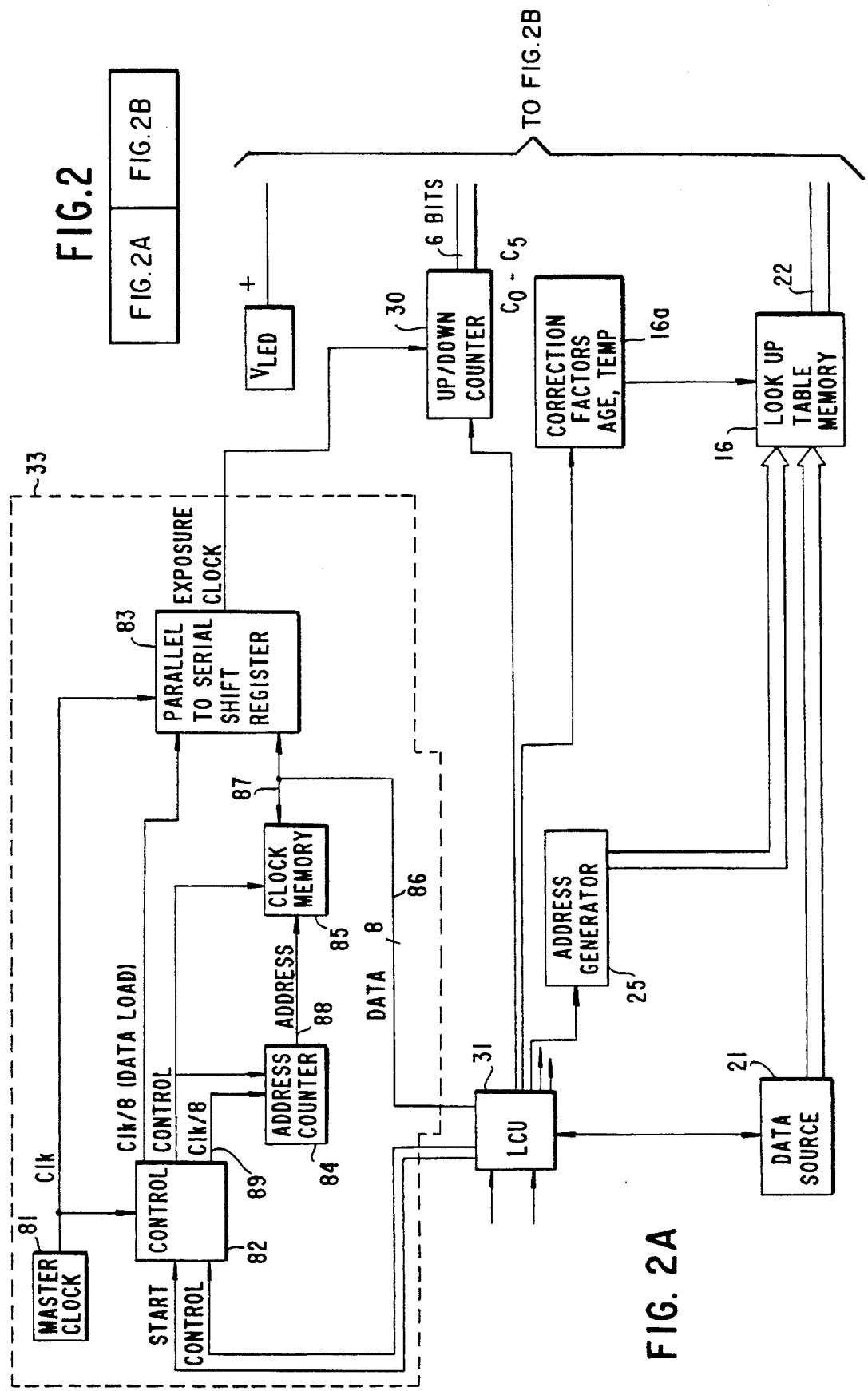

METHOD AND APPARATUS FOR GREY LEVEL PRINTING

BACKGROUND OF THE INVENTION

1. Field of the Invention

The present invention relates to apparatus and methods for non-impact printing of halftone or continuous tone information and the like with small pixels (dots).

2. Description of the Prior Art

In published International Patent Application WO 91/10311, the contents of which are incorporated herein by this reference, a method and apparatus for recording grey level pixels is described which includes controlling exposure pulse durations of radiation-emitting recording elements by a non-linear clock. In such method and apparatus, a multibit data signal is compared with a time-changing count from a counter and pulse duration controlled on the basis of the comparison between the data and the count. The time-changing count of the counter is changed by a programmable exposure clock that includes a master clock and a programmed counter that receives a multibit number representing a count or transition time and determines when a pulse is to be output by the counter. A disadvantage with the method and apparatus of the prior art is that if exposure clock edges are required to be one or two master clock cycles apart and the master clock is say a 40 MHz oscillator, very fast processing is required to load successive transition times. Very fast processing can have negative impacts on power requirements and potential electromagnetic emissions and may require more expensive circuit components.

It is therefore an object of the invention to overcome the deficiency of the prior art.

SUMMARY OF THE INVENTION

The above and other objects of the invention which will become apparent from a reading of the specification are realized by a method of grey level printing which uses an array of radiation-emitting elements, the method comprising the steps of (a) advancing an imaging surface adapted to receive radiation relative to the array, selectively enabling the elements to emit radiation for predetermined periods of time during a cycle of operation to form an image on the surface; (b) operating a digital counting means having a plurality of output lines with signals thereon representing in digital form a time-changing count; (c) generating clock pulses to change the count represented by the output lines; (d) comparing the time-changing count with each of several different predetermined counts and generating respective enablement signals in response to respective predetermined counts, the time duration of each enablement signal being different dependent upon a respective predetermined count selected, and (e) a set of enablement signals determines enabling times of elements selected to be enabled; and wherein in step (c) the clock pulses are generated by reading from memory clock generating signals and storing said clock generating signals in a serial shift register and then serially shifting said clock generating signals out from said shift register to generate said clock pulses.

The invention is further realized by an apparatus for grey level printing which comprises an array of radiation emitting elements; enabling means for selectively enabling the elements for predetermined periods of time during a cycle of operation to form radiation for use in recording; the enabling means including circuit means for generating a pulsewidth modulated first set of enablement signals for determining the enabling time of selected elements; and wherein the circuit means comprises:

digital counting means having a plurality of output lines representing in digital form a time changing numerical count during a count mode;

exposure clock means coupled to the digital counting means and generating exposure clock pulses for changing the count represented by the output lines, the exposure clock means including a master clock for generating a series of uniformly spaced master clock pulses, an address counter means responsive to a signal representing 1/N master clock pulses, wherein N is an integer greater than one, for generating an address signal, a memory means responsive to said address signal for outputting in parallel a second set of signals for generating exposure clock pulses, and means for storing and for shifting out serially said second set of signals to generate exposure clock pulses; and comparator means coupled to the output lines and comparing the time changing count with each of several different predetermined counts and generating respective enablement signals the duration of each of which are related to a respective predetermined count.

DESCRIPTION OF THE DRAWINGS

FIGS 2, 2A, and 2B (collectively hereinafter referred to as FIG. 2) comprise a schematic of a printer circuit for recording grey scale information in accordance with the invention

DESCRIPTION OF THE PREFERRED EMBODIMENTS

Because apparatus of the type described herein are well known, the present description will be directed in particular to elements forming part of, or cooperating more directly with, the present invention.

Figure 1:
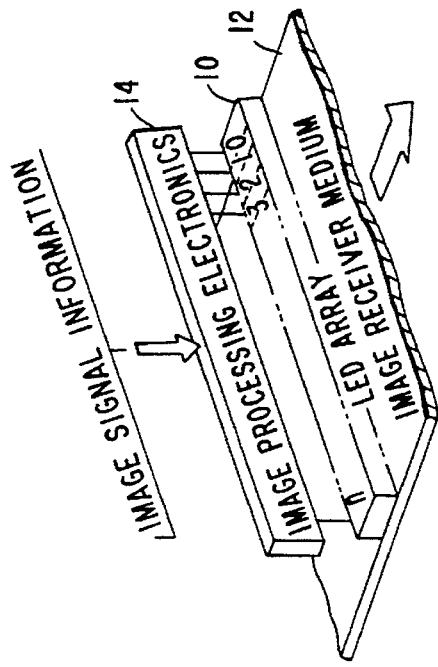
FIG. 1 is a perspective view illustrating the general arrangement of a non-impact printer apparatus as used in the embodiment of the invention and as known in the prior art.

The apparatus for the herein disclosed invention is typified by the diagram of FIG. 1: a linear array 10 of say 3584 triggerable radiation sources; e.g. LEDs, is disposed to expose selectively a photosensitive image-receiver medium 12 that is movable relative to the array by suitable conventional means (not shown). Optical means for focusing the LEDs onto the medium may also be provided. In this regard, gradient index optical fiber devices such as Selfoc (trademark of Nippon Sheet Glass Co., Ltd.) arrays are highly suited. The LEDs of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LEDs may be subsequently developed by conventional means to form a visible image. Where the medium 12 is an electrophotographic receptor, the LEDs may be used to form an electrostatic image on a uniformly electrostatically charged photoconductor and this image developed using colored toner particles and perhaps transferred to a copy sheet, see U.S. Pat. No. 3,850,517.

Figure 2B:
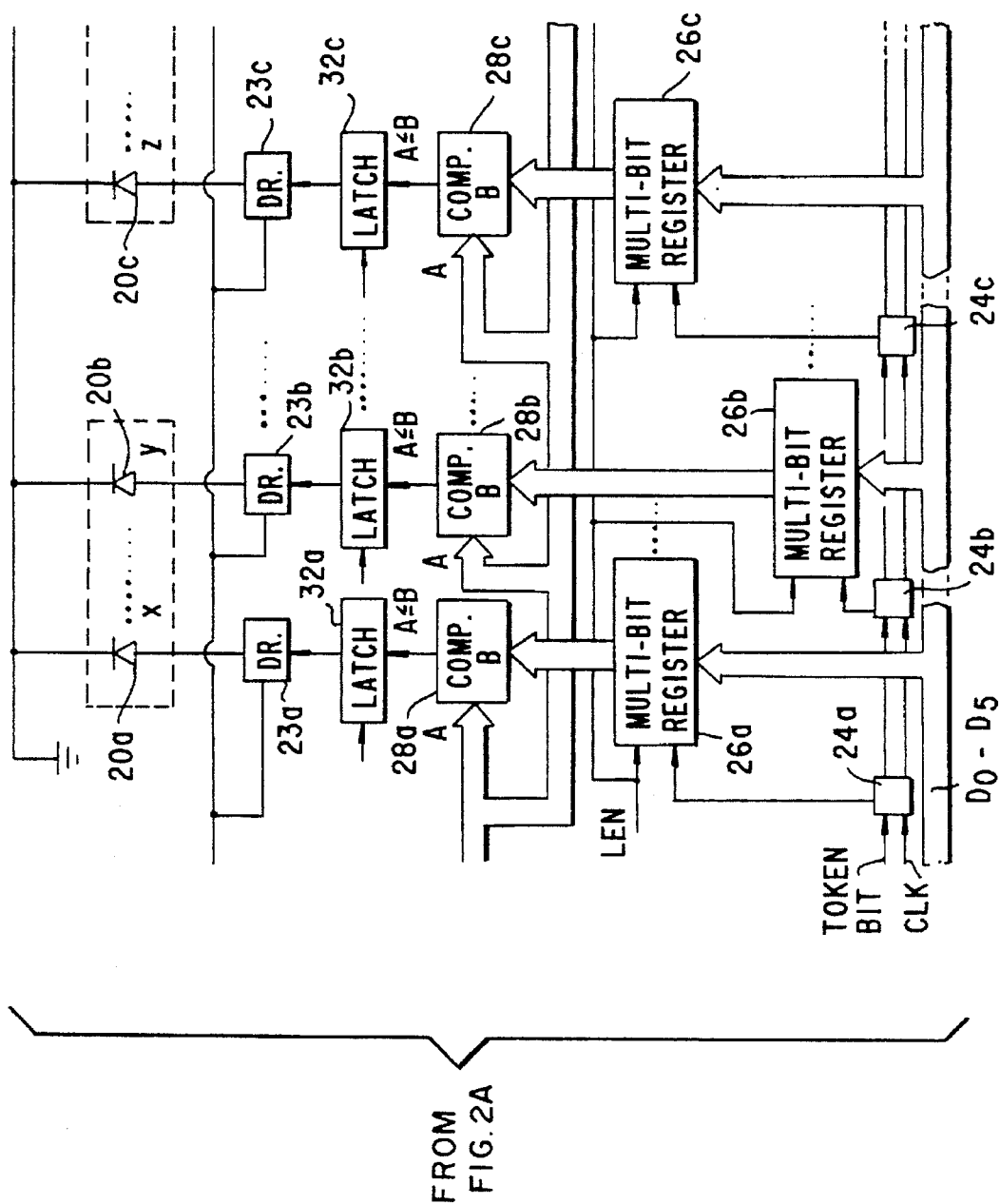

With reference now to FIG. 2, a circuit is shown which may be used for triggering selectively the LEDs 20 that together comprise the array 10. Only a few of the LEDs and its associated driver circuitry are shown for clarity purposes, it being understood that the circuitry for driving such other LEDs is similar to that described for the illustrated examples. While the figure shows all the driver circuitry associated with the LEDs located to one side of the line of LEDs, it is well known to place these circuits on both sides of the line of LEDs to provide more efficient utilization of space.

Data to be printed for each line is in the form of binary digital signals, e.g., 1's and 0's. This data on lines labeled $D_0$–$D_5$ are outputted in parallel onto the data bus 22. The data on lines $D_0$–$D_5$ comprises, in this example, a six-bit signal representing an exposure time for a particular LED for printing a single grey level recorded dot. Synchronously with the generation of each six-bit data signal, there is generated By, for example, a logic and control unit (LCU) 31 a token bit signal which is a single bit that is shifted down a shift register formed by a plurality of individual registers 24a, 24b, 24c, etc. Each such register is associated with a particular LED. This token bit determines which of the LEDs a particular set of data on bus 22 is intended. In operation and in response to a signal representing incremental movement of the image receiving or recording medium relative to the array of LEDs for a cycle of recording a next row of pixels in the main scanning direction, a series of six-bit data signals are provided on bus 22 and one six-bit signal is latched by each of the 3584 multibit registers 26a, 26b, 26c associated with each LED. The latching being in response to the presence of the token bit in the particular register 24a or 25b or 25c, etc. Further description relative to a circuit for selectively latching this data is provided in U.S. Pat. No. 4,746,941, entitled "Dot Printer With Token Bit Selection of Data Latching." After a six-bit data signal is stored in each of the multi-bit registers, a latch enable (LEN) signal is provided by the LCU 31 to shift this six-bit signal to an output stage or latch of each register so that a six-bit level data signal (say decimal 10 for LED 20a for this particular PEL period) is output to one input terminal (B) of a respective digital comparator 28a, 28b, 28c, etc. associated with each LED. It will be appreciated that, while data for the next row of pixels to be recorded is being distributed to register 26a, 26b, 26c, the data in the latches 32a, 32b and 32c are used to record the immediately previous row of pixels during a different cycle of recording. At this point in time in each cycle of recording a digital counter 30 is enabled by LCU 31 to count down, in this example, from decimal 63 ($2^6$–1) to 0. The output of the counter 30 is a six-bit signal, in this example, ($C_0$–$C_5$) representing in digital form a number or count which changes periodically in accordance with clock pulses from a programmable clock 33. With each exposure clock pulse (or trailing edge of same) from clock 33, the counter 30 changes its count at its output. The output of counter 30 is input into each of the input terminals (A) of the digital comparator. Thus, the comparators now compare the signals at their respective A and B inputs in accordance with the comparators criterion for operation, e.g., is A less than or equal to B? For this comparison criterion, when the count output by the exposure clock counter 30 and inputted at terminal A is less than or equal to a respective input data signal count input at terminal B (decimal 3, for example and note FIGS. 4a and 4b, but can be any number between 1 and 63) the output of a respective comparator goes to a digital logic high level and is latched at a respective latch register 32a, 32b, 32c, etc. at the rising edge of the next exposure clock pulse from exposure clock 33. The latched signals form a set of enablement signals to cause drivers 23a, 23b, 23c to thus be enabled to commence and maintain current respectively to LEDs 20a, 20b, or 20c, etc. After the counter 30 counts down to zero, the counter 30 is either reset by the next exposure clock pulse into a count-up mode or is inhibited from counting additional clock pulses for a minimum period $T_{MIN}$ that is programmed into the counter or provided by other suitable means. For example, the duration of $T_{MIN}$ may be from a count of "1" in the down counting mode to a count of "1" in the up counting mode and the manner for controlling the time for reaching these counts will further be described below. In any event, after this predetermined time period $T_{MIN}$, the counter is set to count in its count-up mode and commences counting clock exposure pulses again. When the counter output in its count-up mode reaches decimal 3, the output of comparator 28a changes and the latch 32a is reset and current to the LED 20a ceases with the rising edge of the next exposure clock pulse. The other LEDs 20b, 20c, etc. operate in similar fashion but their data will require different count values to turn on and off in accordance with grey scale data provided in their respective multi-bit registers. What these LEDs will, thus, have in common with LED 20a is that all will have their respective current pulses centered if the exposure clock is symmetrical. The current level to each LED is the same but the pulse duration for each LED during each line of print is varied. In this embodiment the LEDs may be initially "balanced" such as by adjusting a "trim" resistor, associated with each driver chip; see for example, PCT Publication WO 88/07729 or in accordance with the techniques and circuitry described in U.S. Pat. No. 4,885,597. In addition, further balancing or correction for unequal light output from LED to LED may be provided by adjustment of the data in accordance with the characteristics of each LED. Thus, a memory device such as a programmable read-only memory device (PROM) or look-up table memory 16 may store the characteristics of each LED and data for that LED can be modified to provide an input count at terminal B that represents data modified by the exposure characteristics of the LED. For example, for an LED that is a relatively strong light emitter the PROM would modify data bits for that LED to reduce the count that otherwise would be provided at terminal B based solely on the data. The correction data stored in memory 16 may be updated based on information regarding age and/or temperature of the printer apparatus using correction factors stored in a calculator 16a. In response to signals from an address generator 25, the memory 16 generates a corrected data signal of for example 6-bit value for each for example 4-bit grey level signal representing a pixel to be printed. The address signal identifies the LED that is associated with the incoming 4-bit signal.

Further description relative to this additional type of balancing or recording elements is provided in aforementioned Publication WO91/10311.

With further reference now to FIG. 2, description will now be provided relative to the circuit 33 for generating exposure clock pulses that change with a varying periodicity. A master clock 81 oscillating at say 40 MHz has its master clock pulses input to a control device 82 and a parallel-to-serial shift register 83. Also input to the control device 82 are start and other control signals from LCU 31. The control device includes a pair of divide by N circuits, wherein N is an integer greater than 1 and in this example is 8 and provides from one of these circuits a data load signal to the register 83 which load signal is at a frequency of one-eighth that of the master clock. The control device also provides a control signal to a clock memory which is a RAM or read-write memory 85 and from the other divide by N circuit provides on line 89 clock signals to an address counter 84 which clock signals, CLK/8, are also at a frequency of one-eighth that of the master clock. The CLK/8 signals on line 89 are counted by address counter 84 to generate a multibit digital signal, say 9 bits for example, that is input to clock memory 85 to identify an address in clock memory 85. Prior to the start of each cycle of recording a line of pixels in the main scan direction, address counter 84 is set by a control signal from control device 82. The data contents of clock memory 85 were previously loaded via bus lines 86 and 87 from LCU 31. This data in the form of 8-bit bytes represents a series of exposure clock pulses as will be described and maybe loaded in clock memory 85 at the start of each job or image frame. For example, the clock memory 85 maybe loaded with different values, when the medium being exposed is a photoconductor and different sets of exposure clock pulses can be used for exposing different image frames that are to be developed in different colors.

To commence an exposure of a line of pixels in the main scan direction, the control device 82 provides a signal to address counter 84 to output an address signal on line 88 to clock memory 85. The address signal identifies an 8-bit byte stored at that address in clock memory 85 and outputs same, in response to a control signal placing memory 85 in a read mode, over bus line 87 to parallel-to-serial shift register 83. Note that bus line 87 is equal to N in width, e.g., 8 bits wide. In response to master clock pulses from master clock 81, the shift register serially shifts out each stored 8-bit byte to generate exposure clock pulses and pause periods on the exposure clock line. As may be seen in FIG. 3, a series of exposure clock pulses are shown representing exposure count values 63, 62, 61, etc. Such an exposure system is typical where the counter 30 is a 6-bit counter and corrected data of 6 bits is compared by comparators 28a, 28b, 28c, etc. with the count from counter 30. In the illustrated example the exposure counter 30 will count down from 63 to 0 and then count up from 1 to 63 with the count-up wave form set of exposure pulses being symmetrical with the count-down wave form set to provide a center pulsewidth modulated set of waveforms; see also Ayers et al U.S. Pat. No. 4,750,010, the contents of which are incorporated herein by this reference. However, it is not essential in the use of the invention that the pixel durations, during a main scan recording cycle, be center pulsewidth modulated.

Figure 3:
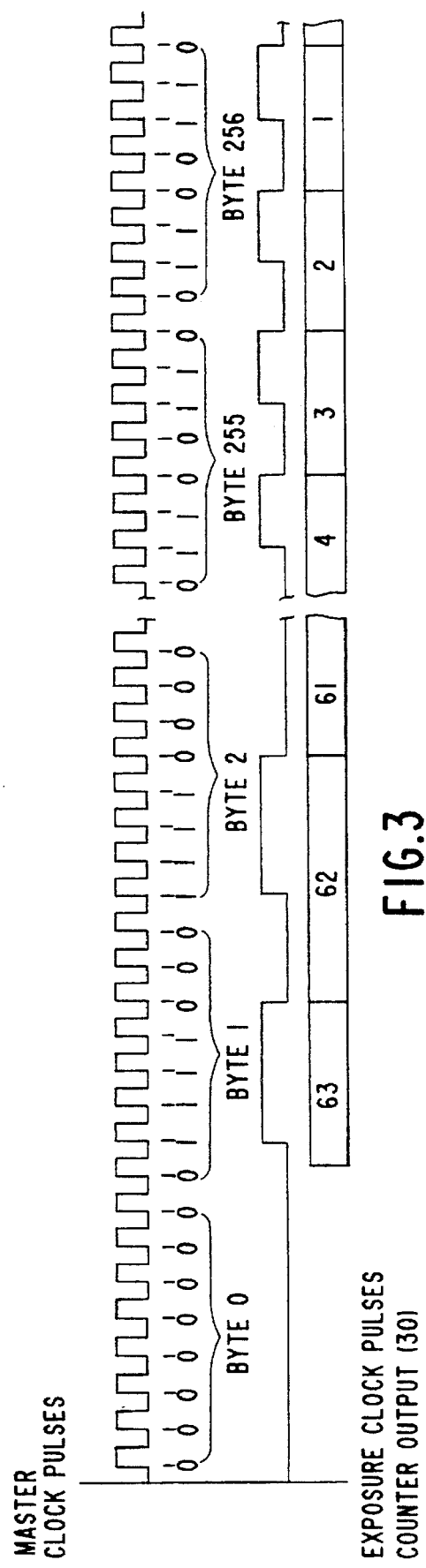
FIG. 3 is a timing diagram illustrating an example of master clock and exposure clock pulses and provided to facilitate an understanding of the operation of the printer circuit of FIG. 2.

In the example of FIG. 3, the first byte, Byte 0, of 512 bytes to be shifted one bit at a time from shift register 83 is the following set of digital logic signals—00000000. As there are no logic high level signals in byte 0 the exposure counter remains unchanged at 63. Subsequent to shifting out of the bits of byte 0, the 8 bits of byte 1 are moved from clock memory 85 to shift register 83 and then shifted serially from shift register 83. As may be seen in FIG. 3, Byte 1 has a string of four 1's and upon shifting these high level digital signals from shift register 83, the output of the shift register goes high and remains high until there is a change in the logic bit being shifted out upon the next up-going leg of a master clock pulse. The pulse-width of the exposure clock pulses are adjustable by controlling the number of 1's in a string. Thus, for the illustrated bytes 255 and 256 there are only two 1's in a string and the exposure clock pulses are of shorter duration. As noted above, the up-going legs of the exposure clock pulses cause the latches 32a, 32b ... 32c, etc. to sample the respective outputs of comparators 28a, 28b ... 28c, etc. and where a respective comparator criterion is met a respective LED will commence to be driven (or if being driven, the driving current thereto may be terminated). By adjusting the pulsewidth of the exposure clock pulses there is allowed flexibility in spacing of successive up-going legs of the exposure clock pulses and thus flexibility in spacing commencement (or termination) timing of driving current to respective LEDs. This is advantageously used for generating the shorter exposure time periods where there tend to be smaller differences between adjacent exposure periods.

In determining the particular sequence in each byte the location of the desired placement of the exposure clock pulses is first determined such as by using the techniques described in aforementioned Publication WO91/10311 and U.S. application Ser. No. 07/498,512, filed in the name of Tai. In a 6-bit system there will be needed 127 exposure clock pulses. Each exposure clock pulse is then associated with a corresponding string of master clock pulse to define the location of the digital 1's. Each group of 8 consecutive master clock pulses with its associated digital 0's and 1's is grouped as a digital byte and stored by the LCU 31 at a suitable address in clock memory 85. For example, 512 bytes may be stored to define 127 clock pulses. The additional bytes allow flexibility in providing appropriate spaces between exposure clock pulses. These spaces will be large for the longer exposure durations and thus bytes having only 0's are used to space the exposure clock pulses. Where the total set of bytes does not require change, the memory may be a ROM instead of RAM. The set of bytes may be adjusted with requested changes in grey level exposure with age of recording elements or as noted above, for color being recorded. The exposure clock pulses may be separated non-linearly (non-uniform spacing between at least some exposure clock pulses) or linearly (uniform spacing between all exposure clock pulses). Examples of these are provided in FIGS. 4a and 4b, respectively.

Figure 4A:
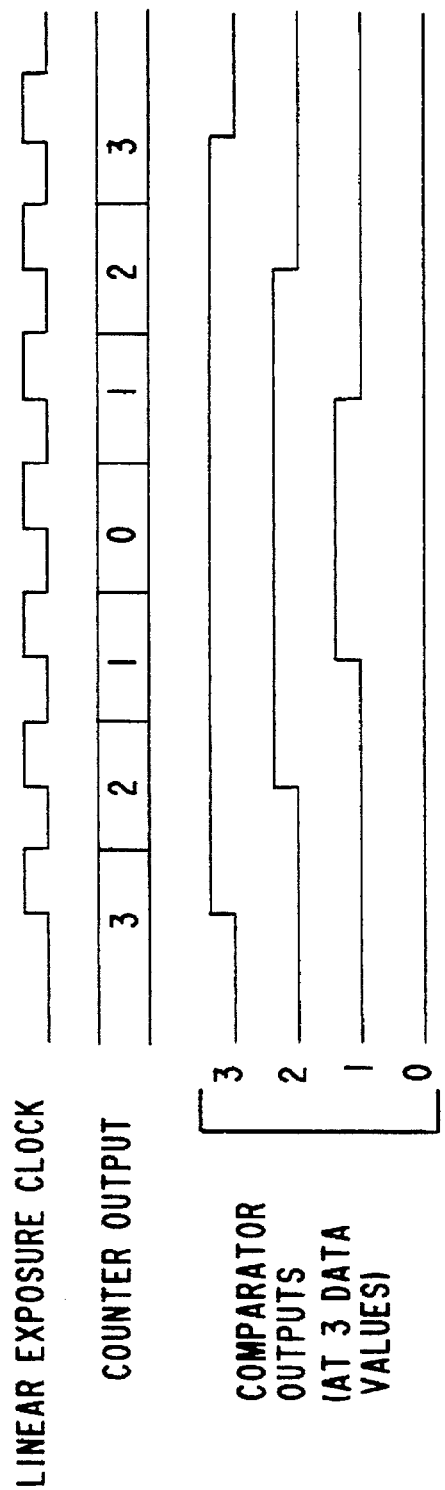
FIGS. 4a and 4b are illustrative examples illustrating a relationship between various pulses generated in accordance with the printer circuit of FIG. 2.
Figure 4B:
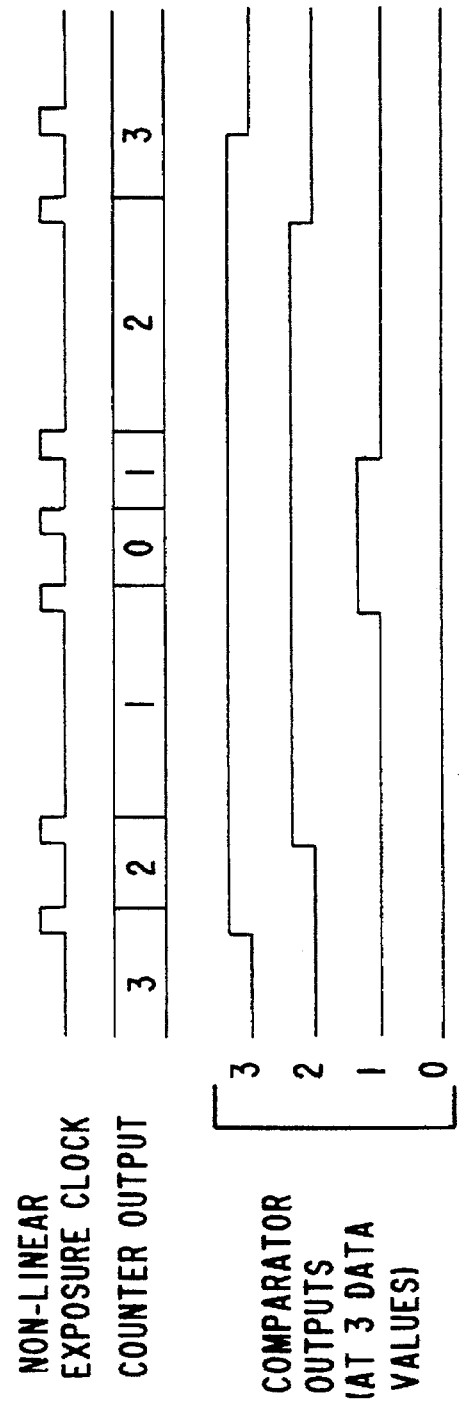

With reference to FIGS. 4a and 4b, a simplified illustration of pulse signals in an exposure system is illustrated showing the center pulse-width modulation of exposure signals for a linear exposure clock FIG. 4a and a non-linear exposure clock FIG. 4b.

Thus, a programmable clock generator 33 is described that uses a RAM 85 (or ROM if reconfiguring the clock is not required) to store the actual state of the exposure clock signal level for each transition of the master clock 81 during an exposure cycle. A counter 84 is used to generate the RAM address. This counter increments from zero to its terminal count during each exposure cycle. It is clocked at 1/N times the master clock frequency (where N is the word width of the RAM device). As the data is read from successive addresses stored in RAM 85, it goes into a parallel-to-serial shift register which converts the data word into a bit stream which generates the exposure clock pulses.

If, as in the example used, an 8-bit wide RAM is used, then data would only need to be loaded into the shift register 83 on every 8th cycle of the master clock. If a 40 MHz master clock is used, this allows 200 ns for each RAM access. In addition, the RAM can be loaded in such a way that an exposure clock transition occurs on every cycle of the master clock and the RAM access time will still be 200 nS.

The size of the exposure clock RAM depends on the user's requirement for edge placement accuracy and maximum on time (maximum duration of the generated pulse stream). Edge placement accuracy is equal to the period of the master clock. A maximum on time is equal to (address counter terminal count +1)× (memory device data width)× (master clock period). For example, if a 40 MHz master clock and a byte (8-bit) wide RAM are used and the address counter terminal count is 511, the maximum on time is calculated as follows. Maximum on time=(512)×(8)×(25 ns)=102.4 µS. The example illustrated in FIG. 3 is provided to facilitate explanation of the invention it being appreciated that with a 40 MMz master clock and considering typical exposure periods for LEDs upon a photoconductive medium that there may be many bytes with no digital 1's.

Although the invention has been described with respect to printing of grey level pixels, it will be appreciated that in its broader aspects the printer apparatus may be used as a binary printer wherein the signal from data source 21 is either a single binary 1 or 0, i.e., print or no print and correction is provided to correct for LED nonuniformity from LED to LED by memory 16 which outputs a respective multibit signal to the comparators for each LED that is selected to be enabled. The invention is also not limited to recording using LEDs as other elements and recording mediums may be substituted, e.g., thermal, laser, etc. In addition, circuitry may be provided for rapidly strobing a recording element during a cycle of recording.

It will also be understood that signals stored in memory can be the logic complement of the exposure clock pulse and that in being read from memory or from the shift register, the signals are inverted. The signals stored in memory may still be considered as generating and/or representing exposure clock pulses.

The invention has been described in detail with particular reference to preferred embodiments thereof, but it will be understood that variations and modifications can be effected within the spirit and scope of the invention.

We claim:

1. A method of printing which uses an array of radiation-emitting elements, the method comprising the steps of:

(a) advancing an imaging surface relative to the array;

(b) selectively enabling the elements to emit radiation for predetermined periods of time during a cycle of operation to form an image on the surface, each of said predetermined periods of time being related to a respective one of plural image data related multi-bit digital signals;

(c) operating a digital counting means having a plurality of output lines with signals thereon representing in digital form a time-changing count that is independent of said image data related signals;

(d) generating exposure clock pulses, that are independent of said image data related signals, to change the count represented on the output lines;

(e) comparing the time-changing count with each of several different image data related predetermined counts that are each defined by a respective one of said image data related multi-bit digital signals, and generating respective enablement pulses in response to respective image data related predetermined counts, a time duration of each enablement pulse being different dependent upon a respective image data-related predetermined count, and a set of enablement pulses determines enabling times of elements selected to be enabled;

and wherein in step (d) the exposure clock pulses are generated by reading a digital word of exposure clock data signals from memory, at least one digital word representing at least two successive exposure clock pulses and storing said exposure clock data signals in a serial shift register and then serially shifting said exposure clock data signals out from said shift register as said successive exposure clock pulses.

2. The method of claim 1 and wherein the set of enablement pulses have a common center time point.

3. The method of claim 2 and wherein the exposure clock pulses are not all uniformly spaced.

4. The method of claim 1 and wherein a series of uniformly spaced master clock pulses are generated and in response to said master clock pulses a count representing an address is generated and input to said memory as an address to select a series of exposure clock data signals for output to said shift register.

5. The method of claim 4 and wherein the exposure clock pulses are not all uniformly spaced.

6. The method of claim 4 and wherein said series of exposure clock data signals are output from said memory in parallel.

7. The method of claim 6 and wherein the exposure clock pulses are not all uniformly spaced.

8. The method of claim 6 and wherein an address counter is incremented for each 1/N master clock pulses, wherein N is an integer greater than 1, to generated said count representing an address.

9. The method of claim 8 and wherein the exposure clock pulses are not all uniformly spaced.

10. The method of claim 1 and wherein the exposure clock pulses are not all uniformly spaced.

11. The method of claim 1 and including the step of generating said respective one of plural image data related multi-bit digital signals in response to an image data multi-bit digital signal that is generated by a data source.

12. The method of claim 11 and wherein the exposure clock pulses are not all uniformly spaced.

13. The method of claim 11 and wherein the image data multi-bit digital signal represents data for printing a grey level pixel and said one of plural image data related multi-bit digital signals represents the image data multi-bit digital signal modified by and exposure characteristic of the radiation emitting element used to record the pixel.

14. The method of claim 13 and wherein the exposure clock pulses are not all uniformly spaced.

15. The apparatus for grey level printing which comprises:

an array of radiation emitting elements;

means for selectively enabling at least some of the elements for predetermined periods of time during a cycle of operation to form radiation for use in recording image data;

the enabling means including circuit means for generating a pulsewidth modulated set of enabling pulses for determining different durations of enabling periods of time of said at least some of the elements; and wherein the circuit means includes:

digital counting means having a plurality of output lines representing in digital form a time changing numerical count during a count mode;

exposure clock means coupled to the digital counting means and generating exposure clock pulses, that are independent of image data, for changing the count represented by the output lines, the clock means including a master clock for generating a series of uniformly spaced master clock pulses, and address counter means responsive to a signal representing 1/N master clock pulses, wherein N is an integer greater than one, for generating an address signal, a memory means responsive to said address signal for outputting in parallel a series of signals representing exposure clock pulses, and means for shifting out serially said exposure clock pulses; and comparator means coupled to the output lines and comparing the time changing count with each of several different predetermined counts related to image data to be recorded and generating respective enabling pulses, each of the enabling pulsed having a duration that is related to a respective one of the predetermined counts.

* * * * *